(12) United States Patent
Park et al.

(10) Patent No.: US 9,294,022 B2
(45) Date of Patent: Mar. 22, 2016

(54) BLDC MOTOR DRIVING APPARATUS AND REFRIGERATOR USING THE SAME

(71) Applicant: Samsung Electronics Co., Ltd., Suwon-si (KR)

(72) Inventors: Sung In Park, Gwangju (KR); Pyeong Ki Park, Gwangju (KR); Jeong Ho Seo, Gwangju (KR); Hyo Jea Shin, Gwangju (KR); Ho Hyun Ryu, Gwangju (KR); Seon Gu Lee, Gwangju (KR); Hyun Chang Cho, Gwangju (KR); Takeda Yoshihiko, Gwangju (KR); Koji Hamaoka, Gwangju (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 279 days.

(21) Appl. No.: 13/940,769

(22) Filed: Jul. 12, 2013

(65) Prior Publication Data

US 2014/0013784 A1 Jan. 16, 2014

(30) Foreign Application Priority Data

Jul. 13, 2012 (KR) ........................ 10-2012-0076959

(51) Int. Cl.
*H02P 6/20* (2006.01)
*H02P 6/08* (2006.01)
*H02P 6/18* (2006.01)
*H02P 7/00* (2006.01)

(52) U.S. Cl.
CPC *H02P 6/182* (2013.01); *H02P 6/08* (2013.01); *H02P 7/00* (2013.01)

(58) Field of Classification Search
CPC ............. H02P 6/182; H02P 6/08; H02P 7/00; H02P 6/16; H02P 6/188

USPC ............... 62/228.1; 318/400.34, 700, 434, 318/400.32–400.35

See application file for complete search history.

(56) References Cited

U.S. PATENT DOCUMENTS

| | | | | |
|---|---|---|---|---|
| 5,857,349 | A * | 1/1999 | Hamaoka et al. | 62/228.4 |
| 7,095,204 | B2 * | 8/2006 | Lee et al. | 318/700 |
| 7,392,158 | B2 * | 6/2008 | Hikawa et al. | 702/185 |
| 7,878,013 | B2 * | 2/2011 | Matsuno et al. | 62/228.1 |
| 8,258,732 | B2 * | 9/2012 | Iwaji et al. | 318/400.11 |
| 2001/0035018 | A1 * | 11/2001 | Takagi et al. | 62/228.4 |

(Continued)

FOREIGN PATENT DOCUMENTS

| | | |
|---|---|---|
| JP | 2008-160950 | 7/2008 |
| KR | 10-0654813 | 12/2006 |

*Primary Examiner* — Mohammad M Ali
*Assistant Examiner* — Meraj A Shaikh
(74) *Attorney, Agent, or Firm* — Staas & Halsey LLP

(57) ABSTRACT

A motor driving apparatus and a refrigerator using the same is provided. The refrigerator may include a compressor, a motor, a driving unit, temperature sensing units sensing the temperatures of storage chambers and an external temperature, and a control unit selecting a driving mode of the driving unit based on the sensing result of the temperature sensing units and controlling the driving unit to drive the motor according to the selected driving mode. In a general operation mode, the control unit controls the driving unit to drive the motor in a 120 degree conduction method, and in a power-saving operation mode, the control unit controls the driving unit to drive the motor in a 90 degree conduction method. The refrigerator increases a pulse width of driving current by converting the conduction method of the motor to drive the motor at a low speed during power-saving operation of the refrigerator.

13 Claims, 14 Drawing Sheets

(56) References Cited

U.S. PATENT DOCUMENTS

| | | | |
|---|---|---|---|
| 2005/0247073 A1* | 11/2005 | Hikawa et al. | 62/228.1 |
| 2006/0132075 A1* | 6/2006 | Lee et al. | 318/439 |
| 2007/0152624 A1* | 7/2007 | Hamaoka et al. | 318/805 |
| 2010/0117572 A1* | 5/2010 | Harada et al. | 318/400.11 |
| 2013/0002178 A1* | 1/2013 | Endou et al. | 318/400.11 |

* cited by examiner

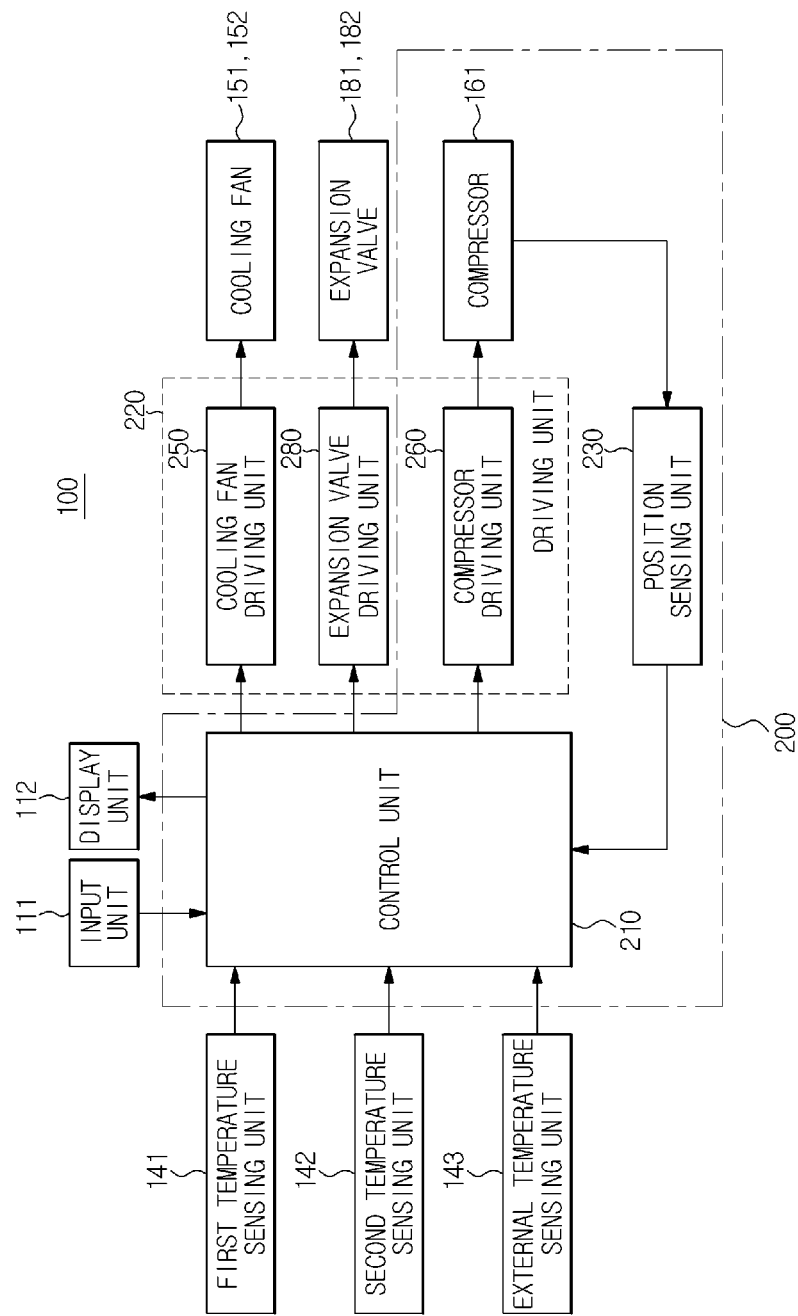

ic force to the compressor, a driving unit driving the motor, temperature sensing units sensing the temperatures of storage chambers and an external temperature, and a control unit selecting a driving mode of the driving unit based on the sensing result of the temperature sensing units, and controlling the driving unit to drive the motor according to the selected driving mode, wherein, in a general operation mode, the control unit controls the driving unit to drive the motor in a 120 degree conduction method, and in a power-saving operation mode, the control unit controls the driving unit to drive the motor in a 90 degree conduction method.

BLDC MOTOR DRIVING APPARATUS AND REFRIGERATOR USING THE SAME

CROSS-REFERENCE TO RELATED APPLICATIONS

This application claims the priority benefit of Korean Patent Application No. 10-2012-0076959, filed on Jul. 13, 2012 in the Korean Intellectual Property Office, the disclosure of which is incorporated herein by reference.

BACKGROUND

1. Field

Embodiments relate to a brushless direct current (BLDC) motor driving apparatus which achieves power-saving operation of a refrigerator, and a refrigerator using the same.

2. Description of the Related Art

In general, a brushless direct current (BLDC) motor uses an inverter circuit including switching elements instead of mechanical elements, such as a brush and a commutator, and is characterized in that replacement of a brush due to abrasion of the brush is not required and electromagnetic interference and noise are minimal.

Such a BLDC motor has been widely used in products requiring high-frequency and variable-speed operation, such as a compressor for refrigerators and air conditioners, and a washing machine.

In order to operate the BLDC motor, flux of a stator needs to be controlled so as to have a right angle or a random angle to flux of a permanent magnet generated from a rotor. For this purpose, the position of the rotor is detected at all times, and the switching state of the switching elements of the inverter is determined so that a flux generating position of the stator is determined according to the position of the rotor. Here, in order to detect the position of the rotor, a resolver, an absolute encoder, or a hall sensor may be used. In case of a compressor for refrigerators and air conditioners, use of a sensor is difficult due to environmental factors, such as temperature and pressure, and thus a sensorless type in which the position of a rotor is detected from voltage or current applied to a motor is mainly used. In general, a sensorless BLDC motor detects the position of a rotor using back electromotive force (back-EMF) of a motor detected through a position detection circuit.

In order to control the rotating speed of the BLDC motor, a pulse width modulation (PWM) method is generally used. That is, driving current applied to the motor is adjusted by inputting driving current, the pulse width of which is modulated, and the rotating speed of the BLDC motor is controlled through the adjusted driving current.

In order to reduce energy consumption, low-speed operation in which a motor used in a compressor for refrigerators or air conditioners is rotated at a low speed is required, and in order to achieve such low-speed operation, the duty of a pulse needs to be decreased.

If the pulse duty of driving current applied to the BLDC motor is very small, detection of the position of the rotor may be difficult.

SUMMARY

In an aspect of one or more embodiments, there is provided a BLDC motor driving apparatus and method in which a pulse duty of driving current is increased during low-speed operation of a BLDC motor.

In an aspect of one or more embodiments, there is provided a refrigerator includes a compressor, a motor providing rotating force to the compressor, a driving unit driving the motor, temperature sensing units sensing the temperatures of storage chambers and an external temperature, and a control unit selecting a driving mode of the driving unit based on the sensing result of the temperature sensing units, and controlling the driving unit to drive the motor according to the selected driving mode, wherein, in a general operation mode, the control unit controls the driving unit to drive the motor in a 120 degree conduction method, and in a power-saving operation mode, the control unit controls the driving unit to drive the motor in a 90 degree conduction method.

The motor may be a BLDC motor, the refrigerator may further include a position sensing unit sensing the position of a rotor of the BLDC motor, and the position sensing unit may detect back electromotive force generated from coils of the BLDC motor.

The control unit may include a mode selector selecting the driving mode of the driving unit based on the sensing result of the temperature sensing units, a speed controller calculating a rotating speed of the BLDC motor based on the output of the position sensing unit and generating a speed control signal controlling the rotating speed of the BLDC motor based on the calculated rotating speed of the BLDC motor, a driving signal generator generating driving signals controlling the driving unit based on the output of the mode selector and the output of the speed controller, and a pulse width modulator modulating the pulse width of the output of the driving signal generator.

The speed controller may calculate zero crossing points (ZCPs) based on the sensing result of the position sensing unit, calculate the position of the rotor of the BLDC motor based on the calculated ZCPs, and calculate the rotating speed of the BLDC motor based on the calculated position of the rotor.

The position sensing unit may include a voltage divider provided between input terminals of the BLDC motor and ground and provide the output of the voltage divider to the control unit.

The driving unit may include a rectifier circuit rectifying external power, a smoothing circuit smoothing DC power rectified by the rectifier circuit, and a driving circuit generating driving current of the BLDC motor based on the output of the control unit.

In an aspect of one or more embodiments, there is provided a motor driving apparatus includes a driving unit driving a motor, and a control unit selecting a driving mode of the driving unit according to an external signal, and controlling the driving unit to drive the motor according to the selected driving mode, wherein, in a general operation mode, the control unit controls the driving unit to drive the motor in a 120 degree conduction method, and in a power-saving operation mode, the control unit controls the driving unit to drive the motor in a 90 degree conduction method.

The motor may be a BLDC motor, the motor driving apparatus may further include a position sensing unit sensing the position of a rotor of the BLDC motor, and the position sensing unit may detect back electromotive force generated from coils of the BLDC motor.

The control unit may include a mode selector selecting the driving mode of the driving unit according to the external signal, a speed controller calculating a rotating speed of the BLDC motor based on the output of the position sensing unit and generating a speed control signal controlling the rotating speed of the BLDC motor based on the calculated rotating speed of the BLDC motor, a driving signal generator generating driving signals controlling the driving unit based on the output of the mode selector and the output of the speed controller, and a pulse width modulator modulating the pulse width of the output of the driving signal generator.

The speed controller may calculate zero crossing points (ZCPs) based on the sensing result of the position sensing unit, calculate the position of the rotor of the BLDC motor based on the calculated ZCPs, and calculate the rotating speed of the BLDC motor based on the calculated position of the rotor.

The position sensing unit may include a voltage divider provided between input terminals of the BLDC motor and ground and provide the output of the voltage divider to the control unit.

The driving unit may include a rectifier circuit rectifying external power, a smoothing circuit smoothing DC power rectified by the rectifier circuit, and a driving circuit generating driving current of the BLDC motor based on the output of the control unit.

BRIEF DESCRIPTION OF THE DRAWINGS

These and/or other aspects will become apparent and more readily appreciated from the following description of embodiments, taken in conjunction with the accompanying drawings of which:

FIG. 5 is a block diagram illustrating control flow of the refrigerator in accordance with an embodiment;

DETAILED DESCRIPTION

Figure 1:
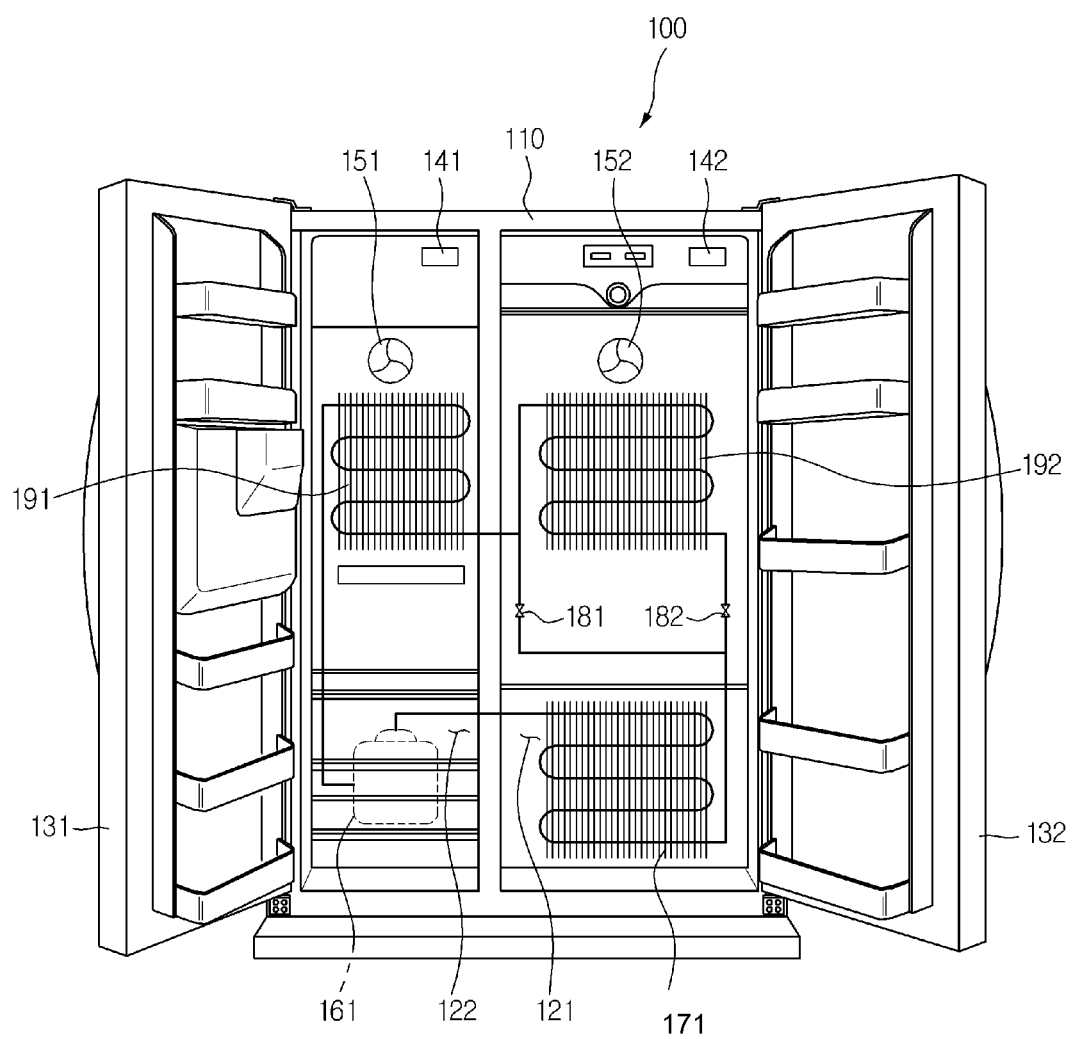
FIG. 1 is a front view briefly illustrating a refrigerator in accordance with an embodiment.

Reference will now be made in detail to embodiments, examples of which are illustrated in the accompanying drawings, wherein like reference numerals refer to like elements throughout.

FIG. 1 is a front view briefly illustrating a refrigerator 100 in accordance with an embodiment.

With reference to FIG. 1, the refrigerator 100 in accordance with an embodiment includes a main body 110 forming the external appearance of the refrigerator 100, storage chambers 121 and 122 storing articles, a cooling device 161, 171, 181, 182, 191 and 192 cooling the storage chambers 121 and 122, and temperature sensing units (temperature sensors) 141, 142 and 143 sensing temperatures of the storage chambers 121 and 122.

The storage chambers 121 and 122 storing articles and ducts (not shown) provided with evaporators 191 and 192 which will be described later are provided in the main body 110, and holes (not shown) through which air cooled by the evaporators 191 and 192 flows between the ducts (not shown) and the storage chambers 121 and 122 are provided on the wall surfaces of the main body 110 provided with the storage chambers 121 and 122.

The storage chambers 121 and 122 includes a freezing chamber 121 storing articles in a frozen state and a refrigerating chamber 122 storing articles in a refrigerated state which are divided side by side by a diaphragm, and the front surfaces of the freezing chamber 121 and the refrigerating chamber 122 are opened.

The freezing chamber 121 and the refrigerating chamber 122 are opened and closed by respective doors 131 and 132. An input unit 111 and a display unit 112 which will be described later may be provided on the doors 131 and 132 of the refrigerator 100.

The temperature sensing units 141, 142 and 143 sensing temperatures of the storage chambers 121 and 122 are provided in the storage chambers 121 and 122, and include a first temperature sensing unit 141 sensing the temperature of the freezing chamber 121 and a second temperature sensing unit 142 sensing the temperature of the refrigerating chamber 122. The temperature sensing units 141, 142 and 143 may further include an external temperature sensing unit 143 (FIG. 5) provided at the outside of the refrigerator 100 and sensing the temperature of the outside of the refrigerator 100.

The temperature sensing units 141, 142 and 143 may employ thermistors, electrical resistance of which is varied according to temperature.

Cooling fans 151 and 152 cause air cooled by the evaporators 191 and 192 provided in the ducts (not shown) to flow into the storage chambers 121 and 122.

The cooling device 161, 171, 181, 182, 191 and 192 includes a condenser 171 condensing a refrigerant in a vapor phase, expansion valves 181 and 182 decompressing the condensed refrigerant in a liquid phase, evaporators 191 and 192 evaporating the decompressed refrigerant in the liquid phase, and a compressor 161 compressing the evaporated refrigerant in the vapor phase. In the evaporators 191 and 192, the refrigerant is converted from the liquid phase to the vapor phase, and during such a process, the refrigerant absorbs latent heat and thus cools the evaporators 191 and 192 and air around the evaporators 191 and 192.

The condenser 171 may be installed in a machine chamber (not shown) provided in the lower portion of the main body 110, or be installed at the outside of the main body 110, i.e., on the rear surface of the refrigerator 100. The refrigerant in the vapor phase is condensed into the liquid phase through the condenser 171. During such a condensing process, the refrigerant discharges latent heat.

If the condenser 171 is installed in the machine chamber provided in the lower portion of the main body 110, the condenser 171 is heated by latent heat discharged from the refrigerant, and thus a radiation fan (not shown) cooling the condenser 171 may be provided.

The pressure of the refrigerant in the liquid phase condensed by the condenser 171 is lowered by the expansion valves 181 and 182. That is, the expansion valves 181 and 182 decompress the refrigerant in the high-pressure and liquid phase to pressure at which the refrigerant may be evaporated by throttling. Throttling refers to a phenomenon that when a fluid passes through a narrow path, such as a nozzle or an orifice, the pressure of the fluid is lowered even without heat exchange with the outside.

Further, the expansion valves 181 and 182 adjust the amounts of the refrigerant so that the refrigerant may absorb sufficient thermal energy from the evaporators 191 and 192. Particularly, if electronic expansion valves are used as the expansion valves 181 and 182, opening/closing and opening degrees of the expansion valves 181 and 182 are adjusted by a driving unit (driver) 220 under the control of a control unit (controller) 210 which will be described later.

The evaporators 191 and 192 are provided in the ducts (not shown) in the inner space of the main body 110, as described above, and evaporate the refrigerant in the low-pressure and liquid phase decompressed by the expansion valves 181 and 182.

During such an evaporating process, the refrigerant absorbs latent heat from the evaporators 191 and 192, and the evaporators 191 and 192 discharging thermal energy cool air around the evaporators 191 and 192.

The refrigerant in the low-pressure and vapor phase evaporated by the evaporators 191 and 192 is provided back to the compressor 161, thereby repeating the refrigerating cycle.

The compressor 161 is installed in the machine chamber (not shown) provided in the lower portion of the main body 110, compresses the refrigerant in the low-pressure and vapor phase evaporated by the evaporators 191 and 192 using rotating force of a motor, and transfers the compressed refrigerant to the condenser 171 under high pressure. The refrigerant circulates along the condenser 171, the expansion valves 181 and 182 and the evaporators 191 and 192 due to pressure generated from the compressor 161.

The compressor 161 of the refrigerator 100 in accordance with an embodiment employs a three-phase brushless direct current (BLDC) motor. However, embodiments are not limited thereto, and the compressor 161 may employ an inductive AC servomotor or a synchronous AC servomotor.

Rotating force generated by the three-phase BLDC motor is converted into translating force by a piston of the compressor 161, and the piston compresses the refrigerant in the low-pressure and vapor phase provided from the evaporators 191 and 192 into a high-pressure state through the translating force.

Otherwise, rotating force generated by the three-phase BLDC motor may be transmitted to rotary blades connected to a rotor of the three-phase BLDC motor, and the refrigerant in the low-pressure and vapor phase may be compressed by stick-slip between the rotary blades and a container of the compressor 161.

Hereinafter, with reference to FIG. 2 briefly illustrating the structure of the three-phase BLDC motor in accordance with embodiment, the motor of the compressor 161 employing the three-phase BLDC motor will be described.

Figure 2:
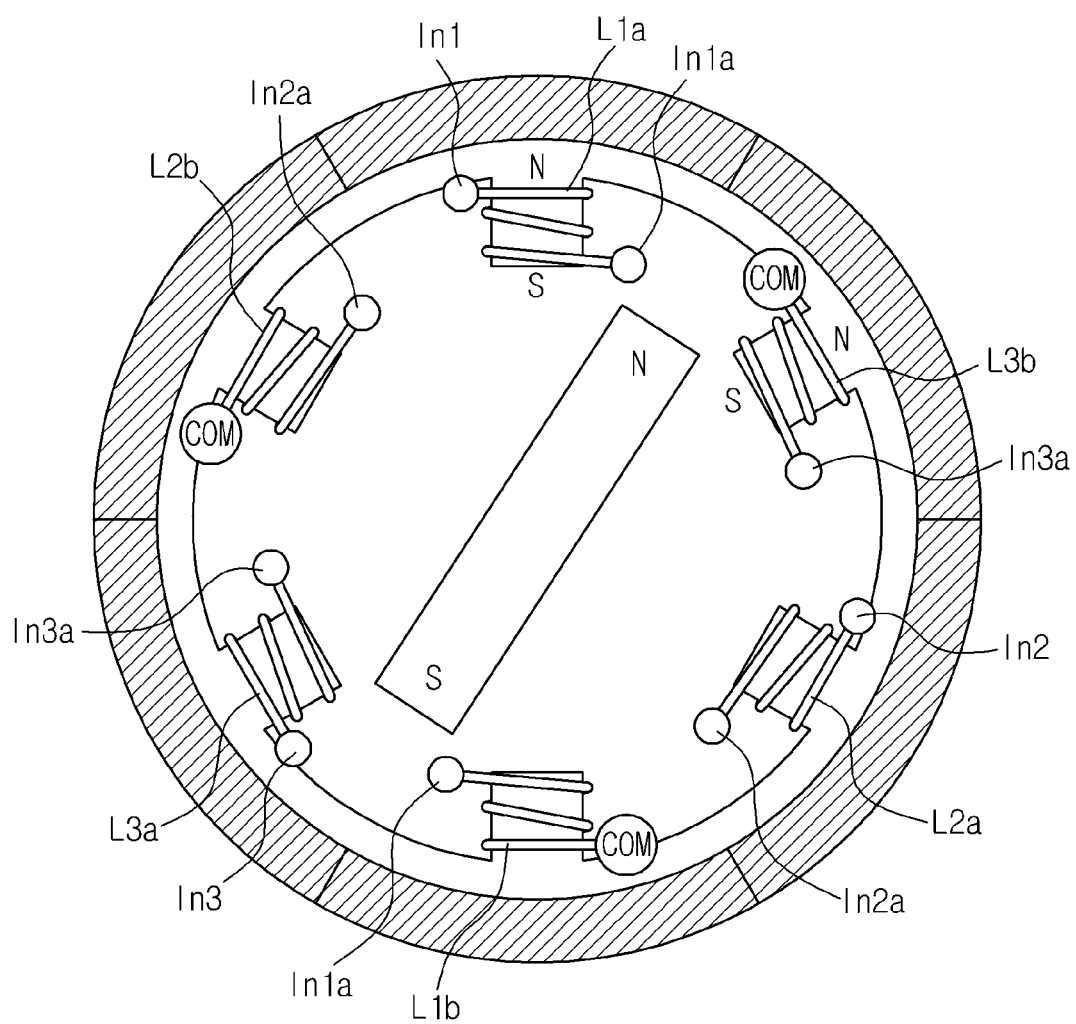
FIG. 2 is a cross-sectional view briefly illustrating the structure of a three-phase BLDC motor in accordance with an embodiment.

As shown in FIG. 2, the three-phase BLDC motor uses coils as a stator and uses a permanent magnet as a rotor, and varies current flowing in the stator through a switching circuit, such as an inverter, so as to continuously rotate the rotor, without a brush to vary current flowing in the coils.

Further, designated ends of three coils are connected (COM), and the other ends of the coils form input terminals In1, In2 and In3 of the three-phase BLDC motor.

Concretely, if current flows from the input terminal In1 to the input terminal In3 of the three-phase BLDC motor while the rotor is rotated in the clockwise direction, the side of the coil Da at the inside of the stator becomes the south pole S and the side of the coil L3b at the inside of the stator becomes the south pole S based on Ampere's right-handed screw rule. Thereby, the south pole S of the coil L3b attracts the north pole N of the permanent magnet used as the rotor, and thus, the permanent magnet used as the rotor may be rotated in the clockwise direction.

Thereafter, if current flows from the input terminal In2 to the input terminal In3 of the three-phase BLDC motor, the side of the coil L2a at the inside of the stator becomes the south pole S and the side of the coil L3b at the inside of the stator becomes the south pole S. Thereby, the south pole S of the coil L2a attracts the north pole N of the permanent magnet used as the rotor, and thus, the permanent magnet used as the rotor may be continuously rotated in the clockwise direction.

The BLDC motor may vary current flowing to the coils used as the stator in the above-described manner, and thus continuously rotate the permanent magnet used as the rotor.

In order to continuously rotate the BLDC motor, as described above, current flowing in the coils used as the stator needs to be properly varied according to the position of the rotor. For this purpose, the position of the rotor is sensed using a hall sensor or an encoder.

However, in high-temperature and high-pressure environments, such as the compressor 161 of the refrigerator 100, installation of a hall sensor may be difficult. Therefore, without use of a hall sensor, the position of the rotor is detected by measuring back electromotive force generated due to rotation of the permanent magnet used as the rotor.

Figure 3:
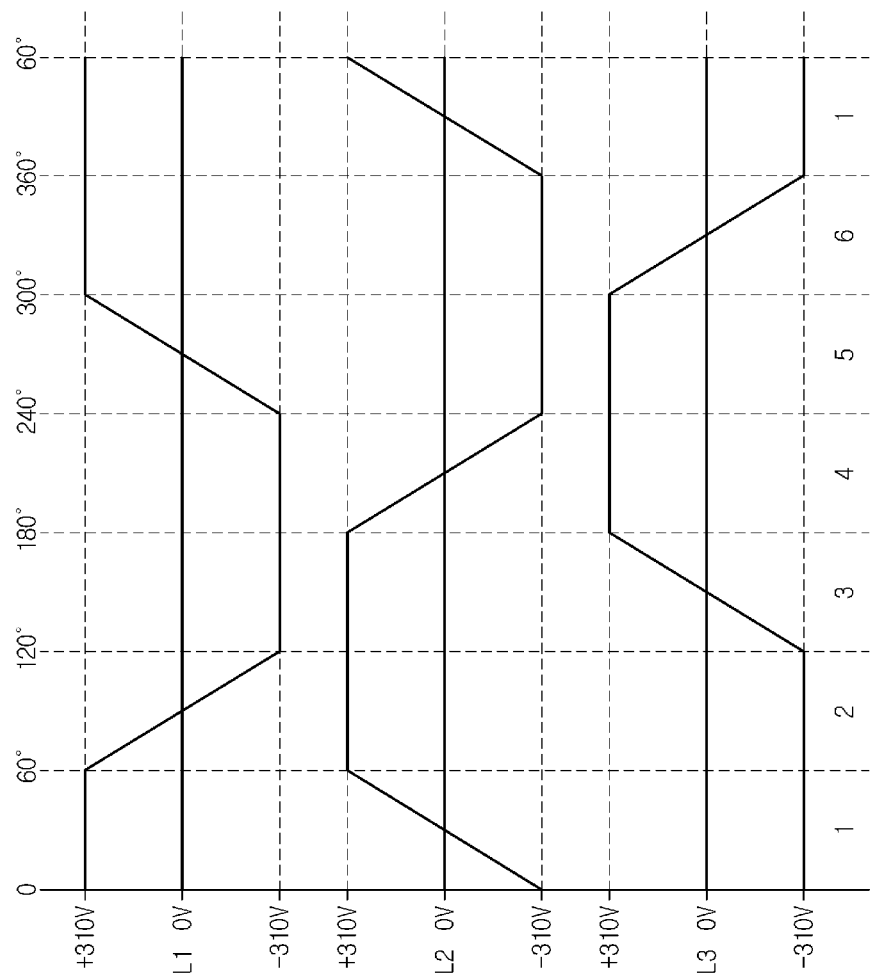
FIG. 3 is a view illustrating back electromotive force generated from each coil of the three-phase BLDC motor in accordance with an embodiment.
Figure 4A:
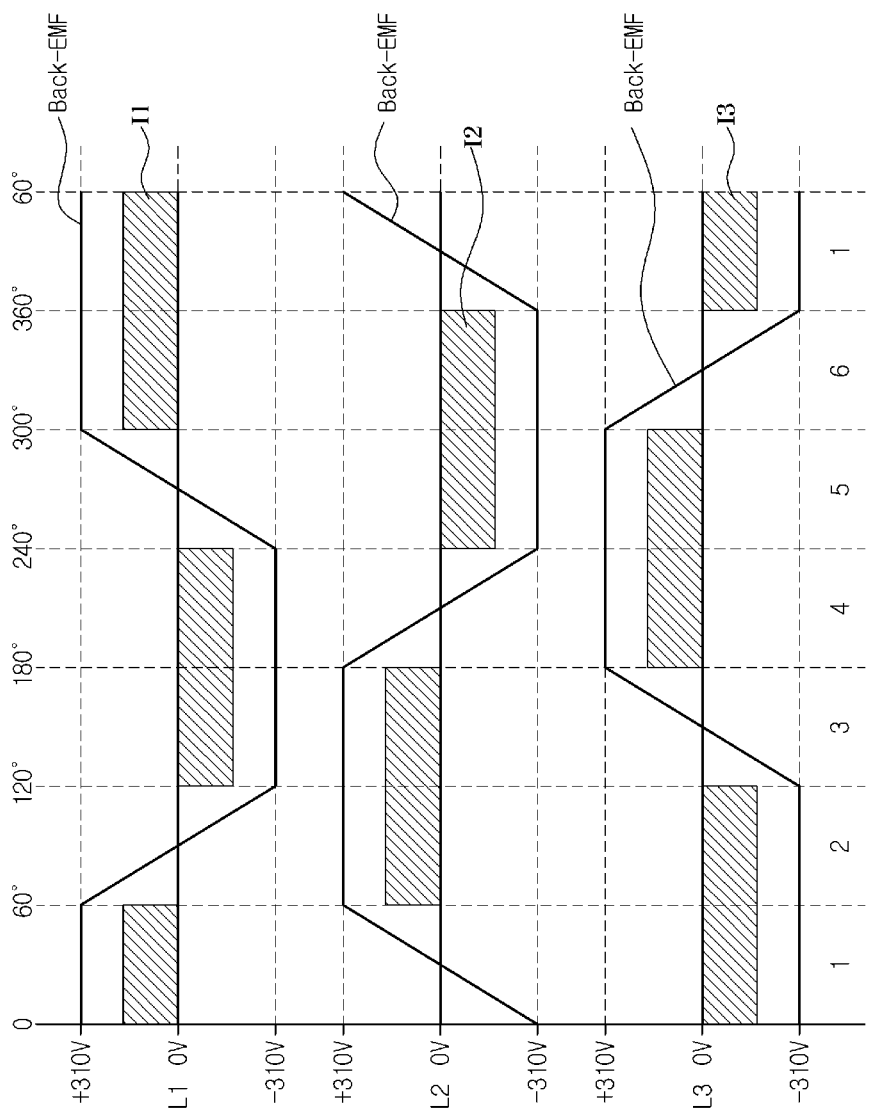
FIGS. 4A and 4B are views illustrating back electromotive force generated from each coil and current flowing in each coil of the three-phase BLDC motor in accordance with an embodiment.
Figure 4B:
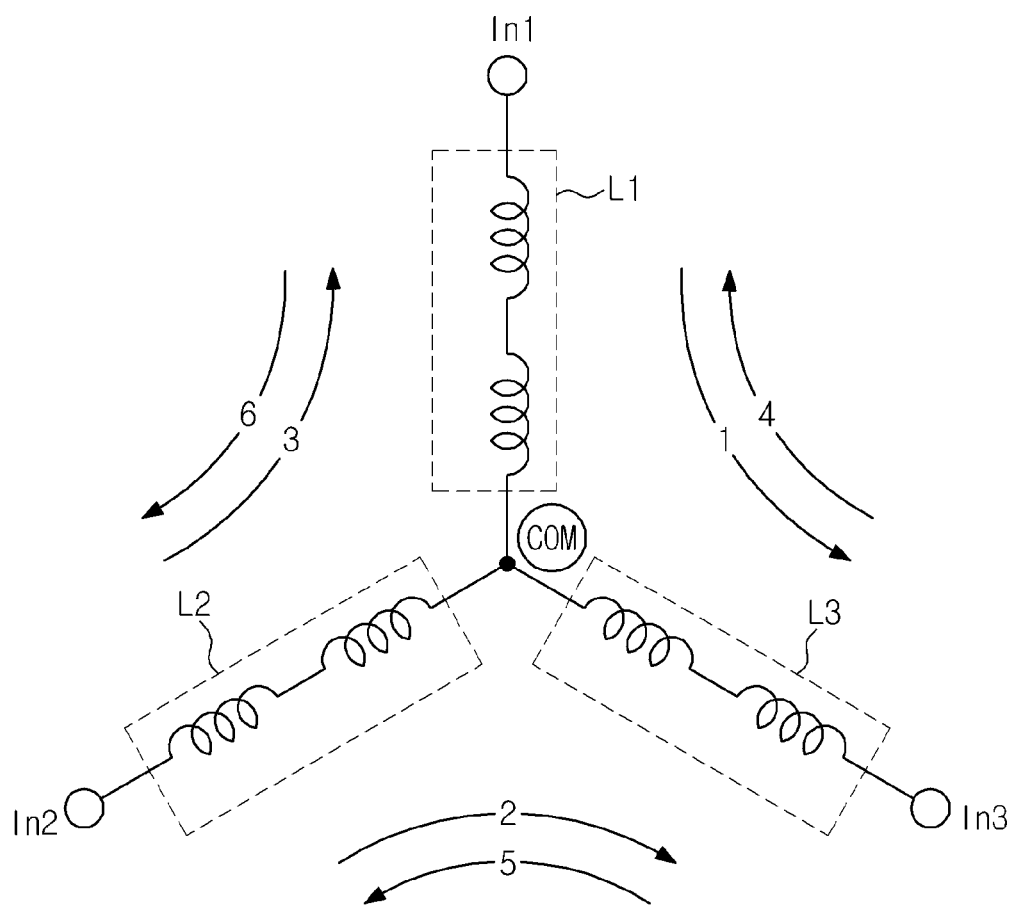

Hereinafter, with reference to FIG. 3 illustrating back electromotive force generated from each coil of the three-phase BLDC motor in accordance with an embodiment and FIGS. 4A and 4B illustrating back electromotive force generated from each coil and current flowing in each coil of the three-phase BLDC motor in accordance with an embodiment, current flowing in each coil of the three-phase BLDC motor in accordance with an embodiment will be described.

As a representative method to measure the position of the rotor through measurement of back electromotive force without use of a hall sensor, a zero crossing point of back electromotive force is used.

If the north pole N of the permanent magnet passes through the coil L1a, back electromotive force of the coil Da increases based on Lenz's law when the north pole N of the permanent magnet is close to the coil Da. That is, back electromotive force of the coil Da becomes the maximum when the north pole N of the permanent magnet is closest to the coil L1a, and decreases when the north pole N of the permanent magnet becomes distant from the coil L1a.

Since the permanent magnet used as the rotor is a dipole having the N pole and the S pole and is rotated, as the N pole of the permanent magnet becomes distant from a coil, the S pole of the permanent magnet becomes close to the coil. When the S pole of the permanent magnet is close to the coil L1a, back electromotive force of the coil Da further decreases and thus reaches negative value via '0'.

Thus, back electromotive force of the coil L1 is varied according to rotation of the permanent magnet used as the rotor.

With reference to FIG. 3, zero crossing of the coil L1 in which back electromotive force of the coil L1 becomes '0' according to rotation of the permanent magnet used as the rotor is generated when the rotating angle of the rotor becomes 90° and when the rotating angle of the rotor becomes 270°, zero crossing of the coil L2 is generated when the rotating angle of the rotor becomes 30° and when the rotating angle of the rotor becomes 210°, and zero crossing of the coil L3 is generated when the rotating angle of the rotor becomes 150° and when the rotating angle of the rotor becomes 330°.

When current flowing in each coil and back electromotive force generated by rotation of the rotor have the same phase, the maximum magnetic torque occurs. That is, if current I1 flowing in the coil L1, current I2 flowing in the coil L2 and current I3 flowing in the coil L3 flow when back electromotive force of each coil is constant, as shown in FIG. 4A, the magnetic torque of the BLDC motor becomes the maximum. FIG. 4B briefly illustrates the direction of current flowing in each coil.

With reference to FIG. 4A, if the rotor is further rotated by an angle of 30° after back electromotive force of each coil becomes '0', when current flows in the coils, the magnetic torque of the BLDC motor may become the maximum. That is, if the rotor is further rotated by an angle of 30° after generation of zero crossing of back electromotive force, the maximum magnetic torque may be acquired by converting the phase of driving current.

Such operation may be executed by allowing a compressor driving unit 260 to control current flowing in each input terminal of the three-phase BLDC motor under the control of the control unit 210 which will be described later.

FIG. 5 is a block diagram illustrating control flow of the refrigerator 100 in accordance with an embodiment. Now, with reference to FIG. 5, control flow of the refrigerator 100 in accordance with an embodiment will be described.

Target temperatures to cool the storage chambers 121 and 122 of the refrigerator 100 so as to store articles for a long time are set. The initial values of the target temperatures are set when the refrigerator 100 is manufactured, and then the target temperatures may be varied by operation of a user. In general, the target temperature of the freezing chamber 121 is set to −20° C. as an initial value, and the target temperature of the refrigerating chamber 122 is set to 4° C. as an initial value.

The upper and lower limits to maintain the set target temperatures of the refrigerator 100 are set. That is, when the temperatures of the storage chambers 121 and 122 are increased to above the upper limits, the refrigerator 100 starts operation and cools the storage chambers 121 and 122, and when the temperatures of the storage chambers 121 and 122 are decreased to below the lower limits, the refrigerator 100 stops operation. In general, the upper limit is set to be higher than the target temperature by 1° C., and the lower limit is set to be lower than the target temperature by 1° C.

The refrigerator 100 in accordance with an embodiment is operated in a general operation mode or a power-saving operation mode according to user selection or a sensing result of the temperature sensing units 141, 142 and 143. In more detail, the refrigerator 100 may be operated in the general operation mode as a basic operation mode, and be operated in the power-saving operation mode by selecting the power-saving operation mode by a user through the input unit 111 which will be described later, or a sensing result of the external temperature sensing unit 143. For example, if the external temperature is lower than the target temperature of the refrigerating chamber 122, the refrigerator 100 may be operated in the power-saving operation mode.

Further, a driving mode of the compressor 161 is determined according to the operation mode of the refrigerator 100. That is, when the refrigerator 100 is operated in the general operation mode, the compressor 161 is driven in a general driving mode, and when the refrigerator 100 is operated in the power-saving operation mode, the compressor 161 is driven in a low-speed driving mode.

The input unit 111 may employ a button switch, a membrane switch or a touchscreen. The input unit 111 receives instructions regarding operation of the refrigerator 100, such as whether or not power is supplied to the refrigerator 100, the target temperatures of the freezing chamber 121 and the refrigerating chamber 132, and whether or not the power-saving operation mode is selected, from a user.

The display unit 112 may employ a liquid crystal display (LCD) panel or an organic light emitting diode (OLED) panel. The display unit 112 displays information regarding operation of the refrigerator 100, such as the target temperatures and current temperatures of the freezing chamber 121 and the refrigerating chamber 132 and whether or not the power-saving operation mode is selected.

A storage unit 240 may employ a flash memory. The storage unit 240 stores various pieces of information regarding operation of the refrigerator 100, such as the target temperatures of the freezing chamber 121 and the refrigerating chamber 122, the general operation mode and the power-saving operation mode.

The driving unit 220 includes a cooling fan driving unit 250 driving the cooling fans 151 and 152, an expansion valve driving unit 280 driving the expansion valves 181 and 182, and a compressor driving unit 260 driving the compressor 161.

The cooling fan driving unit 250 drives cooling fan motors (not shown) to rotate the cooling fans 151 and 152 under the control of the control unit 210, and the expansion valve driving unit 280 drives solenoids of the expansion valves 181 and 182 to open or close the expansion valves 181 and 182 under the control of the control unit 210.

A compressor motor driving apparatus 200 including the compressor driving unit 260, a position sensing unit (position sensor) 230 and the control unit 210 selects a driving mode of the compressor 161 and drives the compressor 161 according to the selected driving mode.

Figure 6:
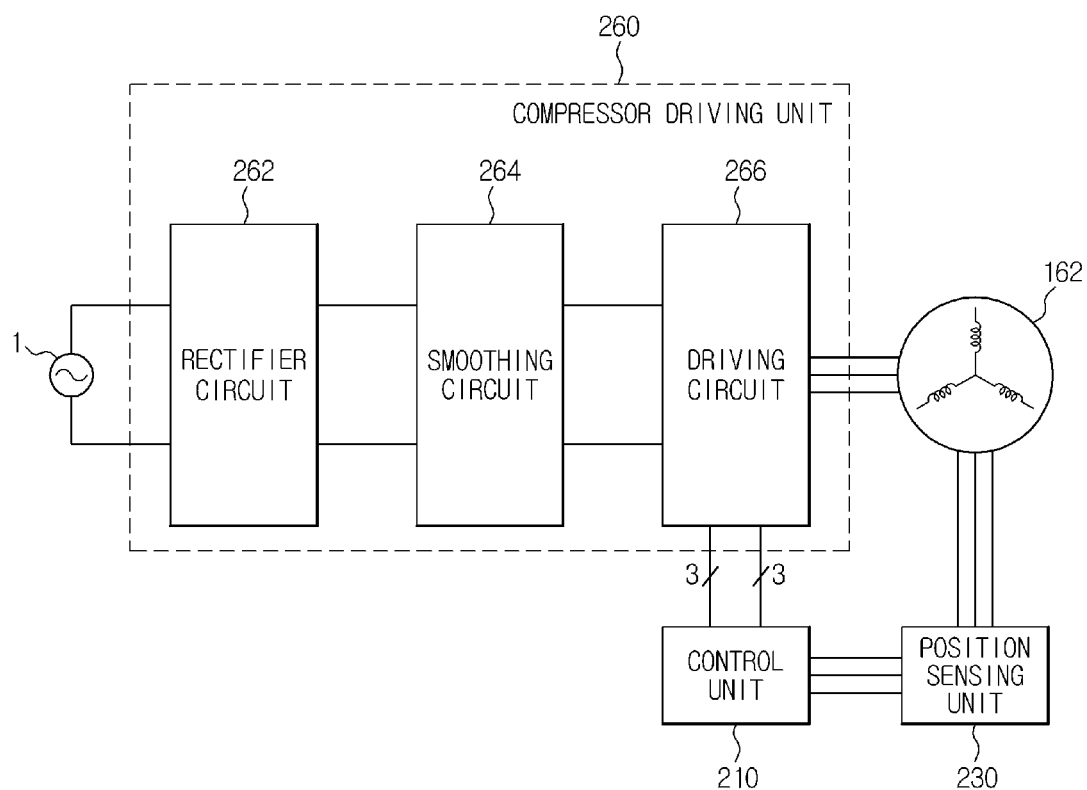
FIG. 6 is a block diagram illustrating control flow of a compressor motor driving apparatus driving a compressor in accordance with an embodiment.

Hereinafter, with reference to FIG. 6 illustrating a control flow of the compressor motor driving apparatus 200, the compressor motor driving apparatus 200 will be described.

The compressor motor driving apparatus 200 includes the compressor driving unit 260 driving the compressor 161, the position sensing unit 230 sensing the position of the rotor of a compressor motor 162, and the control unit 210 controlling torque and rotating speed of the compressor motor 162.

Figure 7:
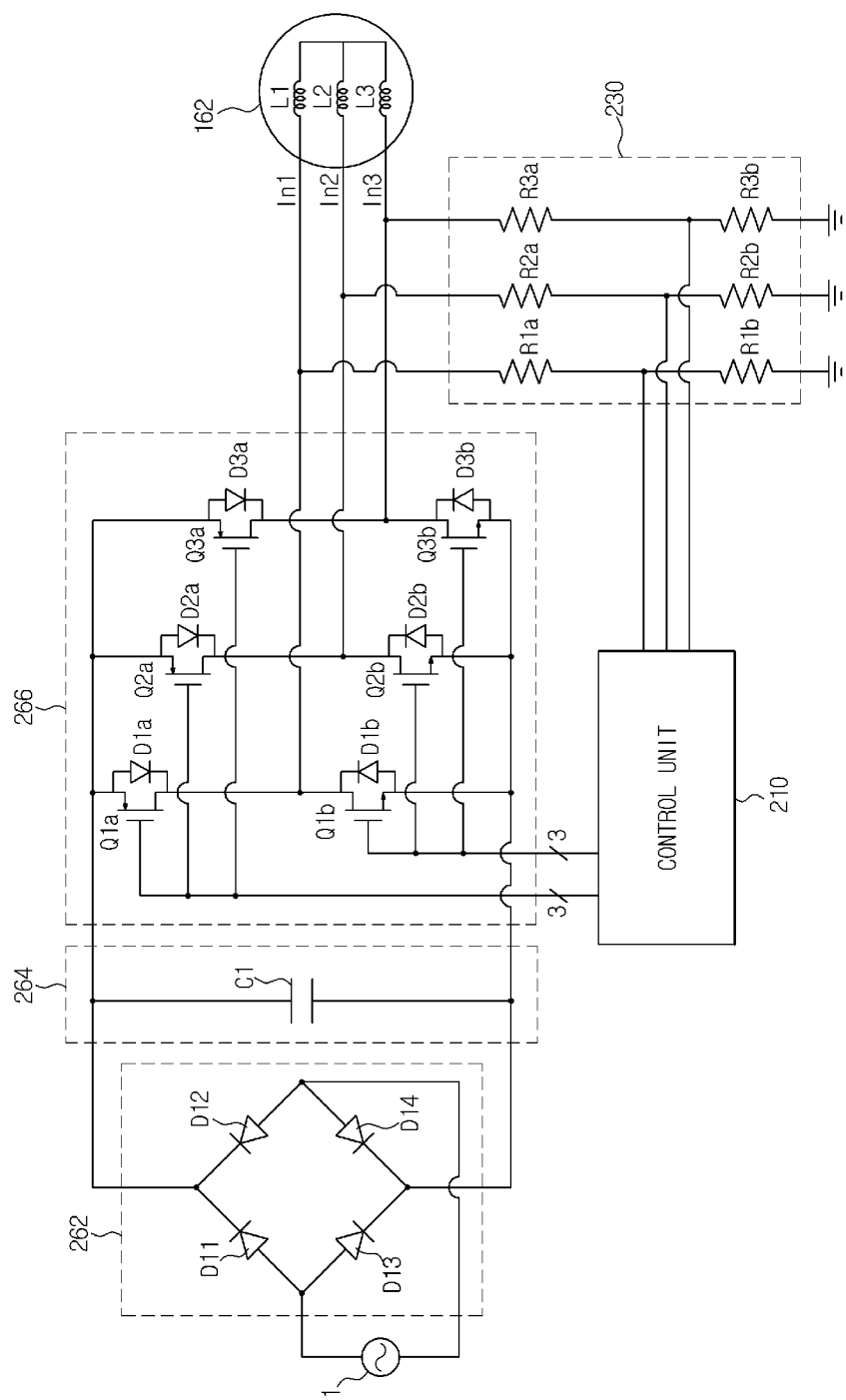
FIG. 7 is a circuit diagram briefly illustrating a compressor driving unit and a position sensing unit in accordance with an embodiment.

Now, with reference to FIG. 7 briefly illustrating the compressor driving unit 260 and the position sensing unit 230, the compressor driving unit 260 and the position sensing unit 230 will be described.

The compressor driving unit 260 includes an external power source 1, a rectifier circuit 262, a smoothing circuit 264, and a driving circuit 266.

The external power source 1 is a commercial AC power source having a frequency of 50 Hz or 60 Hz.

The rectifier circuit 262 connects four diodes D11, D12, D13 and D14 using bridges and converts a negative value of AC voltage of the external power source 1 into a positive value, thus generating voltage of an English letter M shape.

The smoothing circuit 264 includes one capacitor, and converts the voltage of the English letter M shape output from the rectifier circuit 262 into DC voltage having a constant value. Constant power voltage is applied to the driving circuit 266 which will be described later, by the smoothing circuit 264.

The driving circuit 266 is an inverter including six switches Q1a, Q1b, Q2a, Q2b, Q3a and Q3b.

In the driving circuit 266, a total of three pairs of switches, each pair of switches of which is connected in series between power and ground, is provided.

The six switches Q1a, Q1b, Q2a, Q2b, Q3a and Q3b may be metal-oxide-silicon field effect transistors (MOSFETs) or bipolar junction transistors (BJTs). Further, six control signals from the control unit 210 which will be described later are input to gates or bases of the six MOSFETs or BJTs.

In the driving circuit 266, two switches which are not located on the same row among the six switches Q1a, Q1b, Q2a, Q2b, Q3a and Q3b are turned on by the control signals from the control unit 210, and thus provide driving current to the three-phase BLDC motor.

Concretely, when the switches Q1a and Q3b are turned on, the driving circuit 266 provides driving current to the coils L1 and L3 of the three-phase BLDC motor, when the switches Q2a and Q3b are turned on, the driving circuit 266 provides driving current to the coils L2 and L3 of the three-phase BLDC motor, and when the switches Q2a and Q1b are turned on, the driving circuit 266 provides driving current to the coils L2 and L1 of the three-phase BLDC motor. In the same manner, when the switches Q3a and Q1b are turned on, the driving circuit 266 provides driving current to the coils L3 and L1 of the three-phase BLDC motor, when the switches Q3a and Q2b are turned on, the driving circuit 266 provides driving current to the coils L3 and L2 of the three-phase BLDC motor, and when the switches Q1a and Q2b are turned on, the driving circuit 266 provides driving current to the coils L1 and L2 of the three-phase BLDC motor.

It causes driving current of the same type as current to generate a rotating magnetic field rotating the rotor of the above-described three-phase BLDC motor to flow in each coil of the compressor motor.

The position sensing unit 230 has the form of a voltage divider in which two resistors are connected in series between the three input terminals of the compressor motor and ground. That is, resistors R1a and R1b are provided between the input terminal In1 of the compressor motor and ground, resistors R2a and R2b are provided between the input terminal In2 of the compressor motor and ground, and resistors R3a and R3b are provided between the input terminal In3 of the compressor motor and ground. Further, the position sensing unit 230 provides voltage of a node to which a pair of resistors is connected to the control unit 210.

When the ratio of the resistors R1a, R2a and R3a connected to the input terminals In1, In2 and In3 of the compressor motor to the resistors R1b, R2b and R3b connected to ground is set to 99:1, the voltage divider outputs voltage of an intensity of $\frac{1}{100}$ of input voltage. That is, when back electromotive force of 310V is generated from the input terminal In1, only 3.1V is provided to the control unit 210.

Based on driving of the above-described three-phase BLDC motor, when driving current does not flow in the coil of the three-phase BLDC motor, zero crossing in which back electromotive force of the coil becomes '0' is generated. Therefore, a zero crossing point may be detected by measuring voltage of the input terminal connected to the coil to which driving current is not applied among the three input terminals of the three-phase BLDC motor. Concretely, current flows in a pair of resistors forming the voltage divider by back electromotive force generated from the input terminal in which driving current does not flow. That is, when back electromotive force becomes '0', the output of the voltage divider becomes '0'. Such a point of time when the output of the voltage divider becomes '0' may be judged as generation of zero crossing, and the position of the rotor may be estimated using the point of time.

For example, when the switches Q1a and Q3b of the driving circuit 266 are turned on and thus current flows in the coils L1 and L2, it is estimated that zero crossing is generated from the coil L2, current flows in the resistors R2a and R2b of the position sensing unit 230 by back electromotive force generated from the coil L2, and voltage of the node between the resistors R2a and R2b becomes '0' when zero crossing in which back electromotive force becomes '0' is generated. Further, as described above, when the rotor is further rotated by an angle of 30° after generation of zero crossing, driving current may flow in the coils L2 and L3 by turning the switches Q2a and Q3b on and thus a rotating magnetic field may be formed.

The control unit 210 judges whether or not the cooling device 161, 171, 181, 182, 191 and 192 is driven based on the sensing result of the first and second temperature sensing units 141 and 142 provided in the storage chambers 121 and 122, and selects the operation mode of the refrigerator 100 based on user instructions or the sensing result of the external temperature sensing unit 143.

Concretely, the control unit 210 controls the driving unit 220 to drive the cooling device 161, 171, 181, 182, 191 and 192 when the temperatures of the storage chambers 121 and 122 reach the upper limits, and controls the driving unit 220 to stop driving of the cooling device 161, 171, 181, 182, 191 and 192 when the temperatures of the storage chambers 121 and 122 reach the lower limits, based on the sensing result of the first temperature sensing unit 141 sensing the temperature of the freezing chamber 121 and the second temperature sensing unit 142 sensing the temperature of the refrigerating chamber 122.

Further, the control unit 210 switches the current operation mode of the refrigerator 100 to the power-saving operation mode when the external temperature is lower than the target temperature of the refrigerating chamber 122 and switches the current operation mode of the refrigerator 100 to the general operation mode when the external temperature is higher than the target temperature of the refrigerating chamber 122, based on the sensing result of the external temperature sensing unit 143 sensing the temperature of the outside of the refrigerator 100. Moreover, the control unit 210 switches the current operation mode of the refrigerator 100 to the power-saving operation mode when the power-saving operation mode is selected by a user through the above-described input unit 111.

Further, the control unit 210 controls the driving unit 220 to drive the cooling device 161, 171, 181, 182, 191 and 192 in the general driving mode when the refrigerator 100 is operated in the general operation mode, and controls the driving unit 220 to drive the cooling device 161, 171, 181, 182, 191 and 192 in the low-speed driving mode when the refrigerator 100 is operated in the power-saving operation mode.

Figure 8:
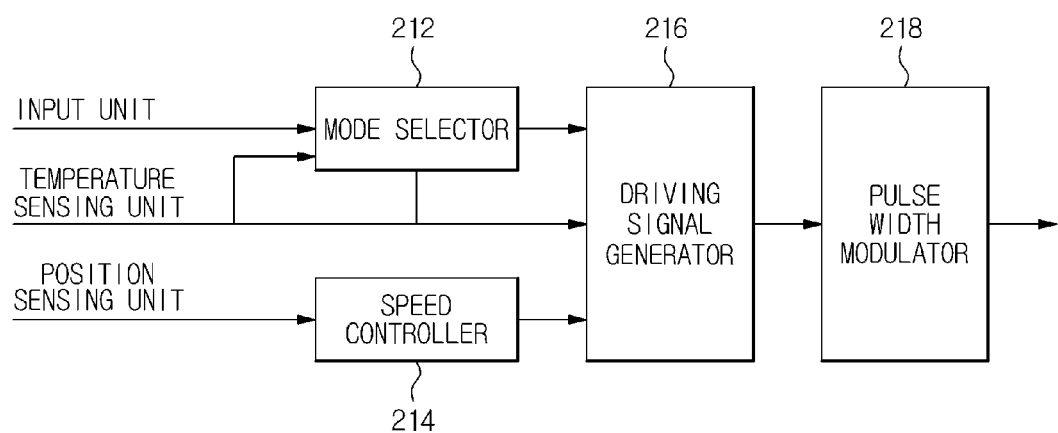
FIG. 8 is a block diagram illustrating control flow of a control unit controlling the compressor in accordance with an embodiment.

With reference to FIG. 8 illustrating control flow of the control unit 210 regarding control of the compressor 161 and selection of the driving mode of the compressor 161, the control unit 210 includes a mode selector 212, a speed controller 214, a driving signal generator 216 and a pulse width modulator 218.

The mode selector 212 selects the operation mode of the refrigerator 100 based on mode selection of a user input through the input unit 111 or the temperature sensing result of the external temperature sensing unit 142, generates a mode control signal according to the selected operation mode, and provides the generated mode control signal to the driving signal generator 216. The driving mode of the compressor 161 and the conduction method of the compressor motor 162 are determined according to the selected operation mode of the refrigerator 100.

Concretely, if power-saving operation is selected by a user or the external temperature is lower than the target temperature of the refrigerating chamber 122 as the sensing result of the external temperature sensing unit 143, the refrigerator 100 is operated in the power-saving operation mode, the compressor 161 is driven in the low-speed driving mode, and the compressor motor 162 is driven in a 90 degree conduction method. Further, if power-saving operation is released by a user or the external temperature is higher than the target temperature of the refrigerating chamber 122 as the sensing result of the external temperature sensing unit 143, the refrigerator 100 is operated in the general operation mode, the compressor 161 is driven in the general driving mode, and the compressor motor 162 is driven in a 120 degree conduction method.

The speed controller 214 generates a speed control signal controlling the rotating speed of the compressor motor 162 and a rotor position signal based on the sensing result of the position sensing unit 230, and provides the speed control signal and the rotor position signal to the driving signal generator 216.

Concretely, the speed controller 214 calculates the position of the rotor based on zero crossing points sensed by the position sensing unit 230 at which back electromotive force of the three coils of the compressor motor 162 becomes '0', and generates a rotor position signal based on the calculated position of the rotor. Further, the speed controller 214 calculates the rotating speed of the rotor, i.e., the speed of the motor, by differentiating the calculated position of the robot by time, and generates a speed control signal by comparing the calculated speed of the motor with a target speed of the motor to normally operate the compressor 161.

The driving signal generator 216 generates a driving signal to rotate the compressor motor 162 based on the mode control signal of the mode selector 212 and the rotor position signal of the speed controller 214 when the temperature of the freezing chamber 121 sensed by the first temperature sensing unit 141 is higher than the upper limit of the freezing chamber 121, i.e., −19° C. or when the temperature of the refrigerating chamber 122 sensed by the second temperature sensing unit 142 is higher than the upper limit of the refrigerating chamber 122, i.e., 5° C.

Concretely, the driving signal generator 216 generates driving signals to turn the six switches Q1a, Q1b, Q2a, Q2b, Q3a and Q3b of the compressor driving unit 260 on/off according to the position of the rotor, in order to generate a rotating magnetic field on the compressor motor 162, Here, the driving signal generator 216 generates driving signals to turn the six switches Q1a, Q1b, Q2a, Q2b, Q3a and Q3b of the compressor driving unit 260 on/off so as to drive the compressor motor 162 in the 120 degree conduction method, when the mode selector 212 selects the general driving mode, and generates driving signals to turn the six switches Q1a, Q1b, Q2a, Q2b, Q3a and Q3b of the compressor driving unit 260 on/off so as to drive the compressor motor 162 in the 90 degree conduction method, when the mode selector 212 selects the low-speed driving mode. The 120 degree conduction method and the 90 degree conduction method of the compressor motor 162 will be described later.

Further, the driving signal generator 216 generates a pulse width control signal based on the mode control signal of the mode selector 212 and the speed control signal of the speed controller 214. The pulse width control signal controls the pulse width of driving current, if the driving current of a pulse type is applied to control the speed of the compressor motor 162.

Concretely, the driving signal generator 216 generates a pulse width control signal to decrease the pulse width of driving current so as to decrease torque of the motor when the speed of the motor calculated by the speed controller 214 is higher than a target speed, and generates a pulse width control signal to increase the pulse width of driving current so as to increase torque of the motor when the speed of the motor is lower than the target speed.

Figure 9:
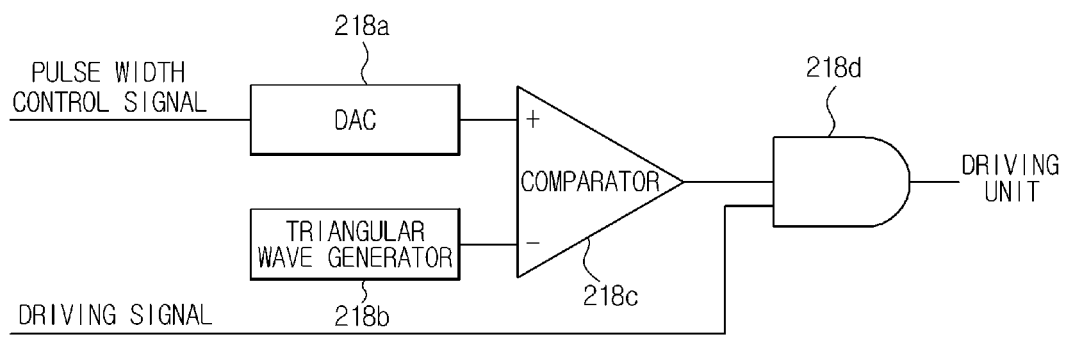
FIG. 9 is a block diagram illustrating a pulse width modulator of the control unit in accordance with an embodiment.
Figure 10:
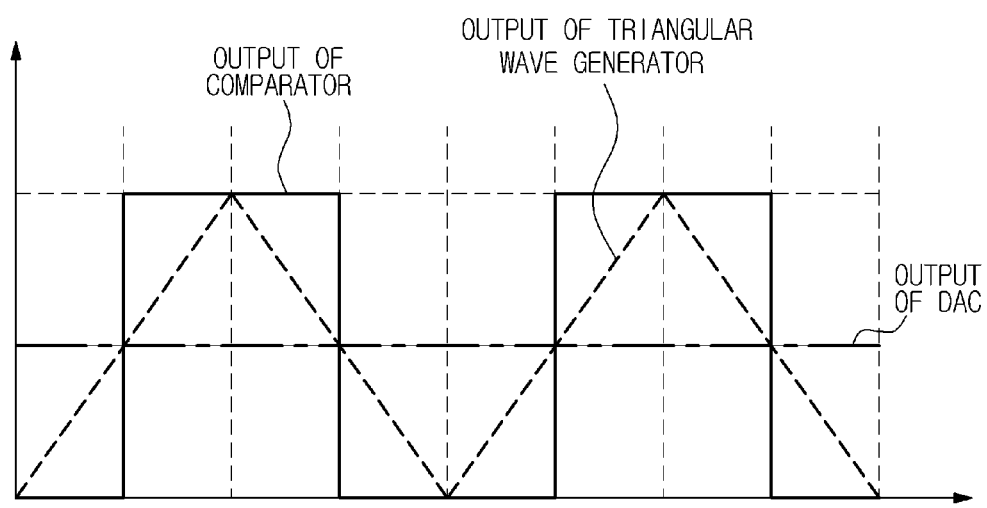
FIG. 10 is a view illustrating output of the pulse width modulator of the control unit in accordance with an embodiment.

Now, with reference to FIG. 9 illustrating control flow of the pulse width modulator 218 and FIG. 10 illustrating outputs of the respective components of the pulse width modulator 218, the pulse width modulator 218 will be described.

The pulse width modulator 218 includes a digital-to-analog converter (DAC) 218a, a triangular wave generator 218b, a comparator 218c and an AND gate 218d.

The DAC 218a converts the pulse width control signal provided by the driving signal generator 216 into an analog value, i.e., a pulse width.

The triangular wave generator 218b generates triangular waves of a predetermined frequency. The triangular waves generated by the triangular wave generator 218b have an isosceles triangular shape rather than a wedge shape.

The comparator 218c compares the output of the DAC 218a with the output of the triangular wave generator 218b. The output of the DAC 218a is input to a positive (+) input terminal of the comparator 218c, and the output of the triangular wave generator 218b is input to a negative (−) input terminal of the comparator 218c. Concretely, when the output of the DAC 218a is greater than the output of the triangular wave generator 218b, the comparator 218c outputs high voltage, i.e., power voltage Vcc, and when the output of the DAC 218a is smaller than the output of the triangular wave generator 218b, the comparator 218c outputs low voltage, i.e., 0V.

With reference to FIG. 10, the output of the triangular wave generator 218b increases from 0 to t2, and decreases from t2 to t4. Further, the output of the DAC 218a is greater than the output of the triangular wave generator 218b from 0 to t1 and thus the comparator 218c outputs power voltage in this section, and the output of the DAC 218a is smaller than the output of the triangular wave generator 218b from t1 to t3 and thus the comparator 218c outputs 0V in this section.

Now, pulse width modulating operation will be described. When the pulse width is increased by the pulse width control signal provided by the driving signal generator 216, the output of the DAC 218a is increased for a longer time than the output of the triangular wave generator 218b and thus, the comparator 218c outputs square waves having a wide pulse width, and when the pulse width is decreased by the pulse width control signal provided by the driving signal generator 216, the output of the DAC 218a is decreased for a longer time than the output of the triangular wave generator 218b and thus, the comparator 218c outputs square waves having a narrow pulse width.

The AND gate 218d executes AND operation of the driving signal which is the target object of pulse width modulation and the output of the comparator 218c. Concretely, when the driving signal is 'high', i.e., the power voltage, a signal, the pulse width of which has been modulated, is output, and when the driving signal is 'low', i.e., 0V, the low driving signal is output, as it is.

Here, six pulse width modulators 218 corresponding to six driving signals of the driving signal generator 216 may be provided, or one pulse width modulator 218 may be provided and thus modulate the pulse width of only a driving signal requiring pulse width modulation among the six driving signals.

Figure 11:
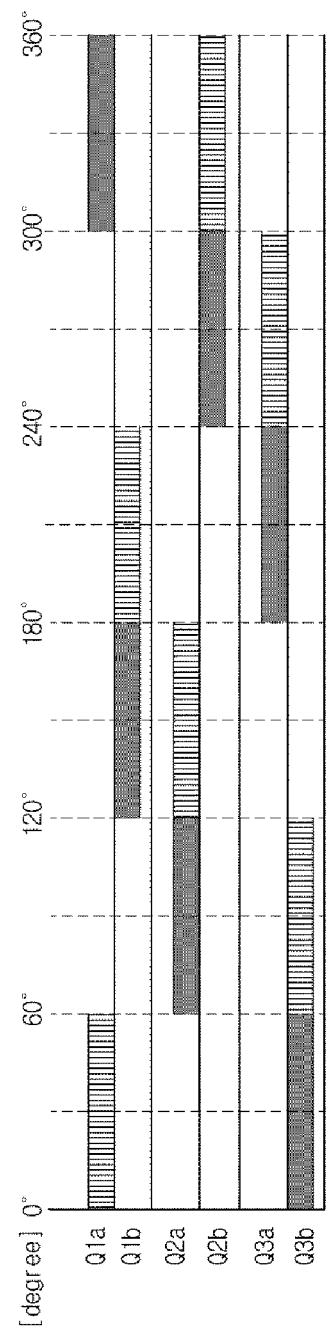
FIG. 11 is a view illustrating flow of driving signals and driving current driving the compressor motor if the refrigerator in accordance with an embodiment is in a general operation mode.

FIG. 11 is a view illustrating flow of driving signals and driving current driving the compressor motor if the refrigerator in accordance with an embodiment is in the general operation mode.

When a user releases the power-saving operation mode or the external temperature of the refrigerator 100 is higher than the target temperature of the refrigerating chamber 122, the refrigerator 100 is operated in the general operation mode. If the refrigerator 100 is operated in the general operation mode, the driving unit 220 is driven in the general driving mode, and the compressor motor 162 is driven in the 120 degree conduction method.

When one of the six switches Q1a, Q1b, Q2a, Q2b, Q3a and Q3b of the compressor driving unit 260 is turned on, the on state of the switch is maintained until the rotor is further rotated by an angle of 120°, and thus such a method is called the 120 degree conduction method.

Further, when another of six switches Q1a, Q1b, Q2a, Q2b, Q3a and Q3b is turned on, the on state of the switch is continuously maintained until the rotor is rotated by an angle of 60°, but the on and off states of the switch are repeated by the driving signal, the pulse width of which has been modulated, until the rotor is rotated by an angle of 120° after rotation of the robot by an angle of angle of 60°.

Concretely, until the rotor is rotated by an angle of 60°, the switch Q1a is turned on while modulating the pulse width and the switch Q3b is continuously turned on. Thereafter, until the rotor is rotated by an angle of 120°, the switch Q2a is continuously turned on and the switch Q3b is turned on while modulating the pulse width. Thereafter, until the rotor is rotated by an angle of 180°, the switch Q2a is turned on while modulating the pulse width and the switch Q1b is continuously turned on.

Thereafter, two switches are turned on in such a manner. That is, one switch is continuously turned on and another switch is turned on while modulating the pulse width.

Figure 12:
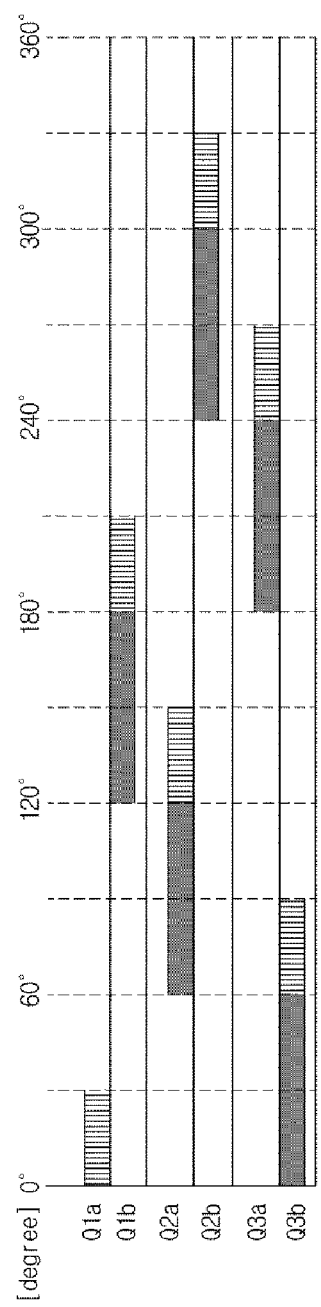
FIG. 12 is a view illustrating flow of driving signals and driving current driving the compressor motor if the refrigerator in accordance with an embodiment is in a power-saving operation mode.

FIG. 12 is a view illustrating flow of driving signals and driving current driving the compressor motor if the refrigerator in accordance with an embodiment is in the power-saving operation mode.

When a user selects the power-saving operation mode or the external temperature of the refrigerator 100 is lower than the target temperature of the refrigerating chamber 122, the refrigerator 100 is operated in the power-saving operation mode. If the refrigerator 100 is operated in the power-saving operation mode, the driving unit 220 is driven in the low-speed driving mode, and the compressor motor 162 is driven in the 90 degree conduction method.

When one of the six switches Q1a, Q1b, Q2a, Q2b, Q3a and Q3b of the compressor driving unit 260 is turned on, the on state of the switch is maintained until the rotor is further rotated by an angle of 90°, and thus such a method is called the 90 degree conduction method.

Concretely, a point of time when the switch is turned on according to the position of the rotor is the same as in the above-described 120 degree conduction method, but a point of time when the switch is turned off is faster than in the above-described 120 degree conduction method by an angle of 30°. Therefore, a time of turning the switch on while modulating the pulse width is half the time in the 120 degree conduction method, and thus, in order to acquire the same rotating speed as in the 120 degree conduction method, the pulse width becomes twice the pulse width in the 120 degree conduction method and the number of switching to modulate the pulse width becomes half the number of switching in the 120 degree conduction method.

Until the rotor is rotated by an angle of 30°, the switch Q1a is turned on while modulating the pulse width and the switch Q3b is continuously turned on.

Thereafter, until the rotor is rotated by an angle of 60°, the switch Q1a is turned off and only the switch Q3b is turned on. Even if the switch Q1a is turned off, current flowing in the coils L1 and L3 does not rapidly disappear but freewheeling current flows in the coils L1 and L3 for a designated time due to inductances of the coils L1 and L3. Such freewheeling current flows in a direction from the coil L1 to the coil L3 in the same manner as when both the switches Q1a and Q3b are turned on, current flowing from the coil L3 passes through a freewheeling diode D1b connected to the switch Q3b and the switch Q1b in parallel and enters the coil L1.

Thereafter, until the rotor is rotated by an angle of 90°, the switch Q2a is continuously turned on and the switch Q3b is turned on while modulating the pulse width.

Thereafter, until the rotor is rotated by an angle of 120°, the switch Q3b is turned off and only the switch Q2a is turned on. Even if the switch Q3b is turned off, freewheeling current is generated due to inductances of the coils L2 and L3.

Thereafter, the control unit 210 controls the six switches Q1a, Q1b, Q2a, Q2b, Q3a and Q3b of the compressor driving unit 260 in the above-described method, thus driving the compressor motor 162 in the 90 degree conduction method.

Figure 13:
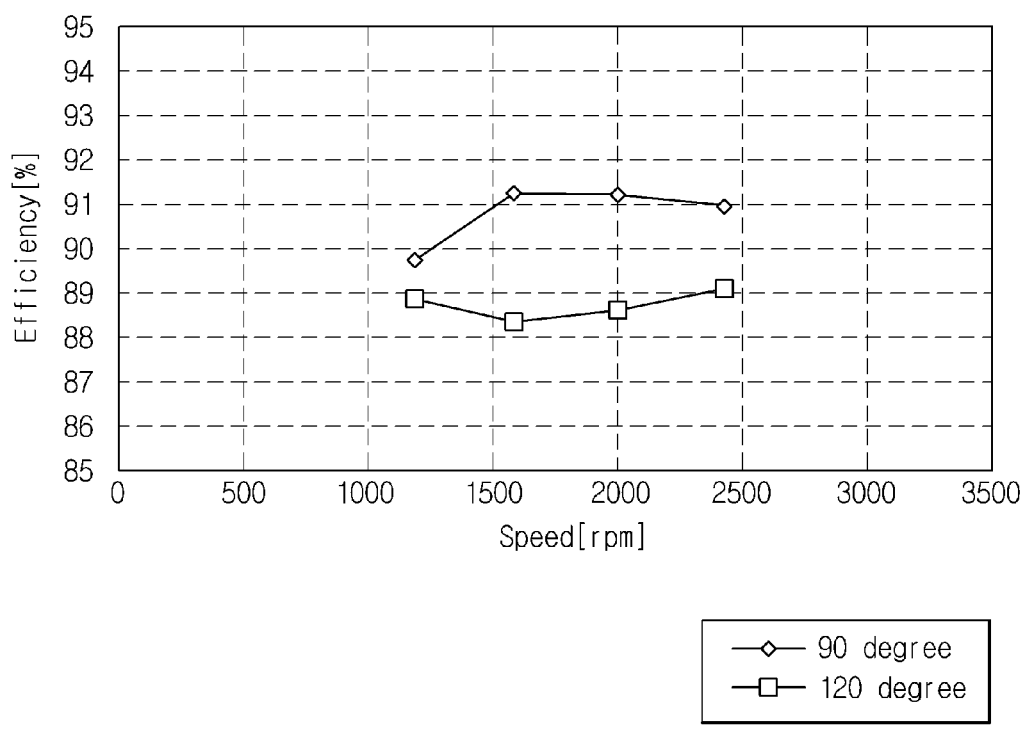
FIG. 13 is a view illustrating efficiency of the compressor motor if the refrigerator in accordance with an embodiment is in the power-saving operation mode and efficiency of a compressor motor of a conventional refrigerator.

FIG. 13 is a view illustrating efficiency of the compressor motor 162 if the refrigerator 100 in accordance with an embodiment is in the power-saving operation mode and efficiency of a compressor motor of a conventional refrigerator.

If the compressor motor 162 is rotated at a low speed, when the compressor motor 162 in accordance with an embodiment is driven in the 90 degree conduction method, the modulated pulse width of driving current is further increased and the number of switching to modulate the pulse width is reduced.

Therefore, as shown in FIG. 13, if the refrigerator 100 is operated in the power-saving operation mode and the compressor motor 162 is rotated at a low speed, the 90 degree conduction method exhibits higher efficiency than the conventional 120 degree conduction method.

As is apparent from the above description, a BLDC motor driving apparatus and a refrigerator using the same in accordance with an embodiment increase a pulse duty of driving current by converting a conduction method of the driving current so as to drive a BLDC motor at a low speed when the refrigerator is operated in a power-saving operation mode.

Although a few embodiments have been shown and described, it would be appreciated by those skilled in the art that changes may be made in these embodiments without departing from the principles and spirit of the disclosure, the scope of which is defined in the claims and their equivalents.

What is claimed is:
1. A refrigerator comprising:
a motor to provide rotating force to a compressor;
a driver to drive the motor and include a plurality of switching elements;
temperature sensors to sense the temperatures of storage chambers; and a controller to select a driving mode of the driver based on the sensing result of the temperature sensors, and to control the driver to drive the motor according to the selected driving mode, wherein, in a general operation mode, the controller controls the driver to drive the motor in a 120 degree conduction method, and in a power-saving operation mode, the controller controls the driver to drive the motor in a 90 degree conduction method, wherein, in the 120 degree conduction method, a switching element having been activated, of the plurality of switching elements is deactivated when the motor is rotated by 120 degrees after the switching element is activated, and wherein, in the 90 degree conduction method, a switching element having been activated, of the plurality of switching elements is deactivated when the motor is rotated by 90 degrees after the switching element is activated.

2. The refrigerator according to claim 1, wherein the motor is a brushless direct current (BLDC) motor, the refrigerator further comprises a position sensor to sense the position of a rotor of the BLDC motor, and the position to detect back electromotive force generated from coils of the BLDC motor.

3. The refrigerator according to claim 2, wherein the controller includes a mode selector to select the driving mode of the driver based on the sensing result of the temperature sensors, a speed controller to calculate a rotating speed of the BLDC motor based on the output of the position sensor and to generate a speed control signal controlling the rotating speed of the BLDC motor based on the calculated rotating speed of the BLDC motor, a driving signal generator to generate driving signals to control the driver based on the output of the mode selector and the output of the speed controller, and a pulse width modulator to modulate the pulse width of the output of the driving signal generator.

4. The refrigerator according to claim 3, wherein the speed controller calculates zero crossing points (ZCPs) based on the sensing result of the position sensor, calculates the position of the rotor of the BLDC motor based on the calculated ZCPs, and calculates the rotating speed of the BLDC motor based on the calculated position of the rotor.

5. The refrigerator according to claim 2, wherein the position sensor includes a voltage divider provided between input terminals of the BLDC motor and ground, and provides the output of the voltage divider to the controller.

6. The refrigerator according to claim 2, wherein the driver includes a rectifier circuit to rectify external power, a smoothing circuit to smooth DC power rectified by the rectifier circuit, and a driving circuit to generate driving current of the BLDC motor based on the output of the controller.

7. A motor driving apparatus comprising:
a driver to drive a motor and include a plurality of switching elements; and
a controller to control the driver to drive the motor according to one of a 120 degree conduction method and a 90 degree conduction method, wherein, in the 120 degree conduction method, a switching element having been activated, of the plurality of switching elements is deactivated when the motor is rotated by 120 degrees after the switching element is activated, and wherein, in the 90 degree conduction method, a switching element having been activated, of the plurality of switching elements is deactivated when the motor is rotated by 90 degrees after the switching element is activated.

8. The motor driving apparatus according to claim 7, wherein the motor is a brushless direct current (BLDC) motor, the motor driving apparatus further comprises a position sensor to sense the position of a rotor of the BLDC motor, and the position sensor detects back electromotive force generated from coils of the BLDC motor.

9. The motor driving apparatus according to claim 8, wherein the controller includes a mode selector to select the driving mode of the driver according to the external signal, a speed controller to calculate a rotating speed of the BLDC motor based on the output of the position sensor and to generate a speed control signal to control the rotating speed of the BLDC motor based on the calculated rotating speed of the BLDC motor, a driving signal generator to generate driving signals to control the driver based on the output of the mode selector and the output of the speed controller, and a pulse width modulator to modulate the pulse width of the output of the driving signal generator.

10. The motor driving apparatus according to claim 9, wherein the speed controller calculates zero crossing points (ZCPs) based on the sensing result of the position sensor, calculates the position of the rotor of the BLDC motor based on the calculated ZCPs, and calculates the rotating speed of the BLDC motor based on the calculated position of the rotor.

11. The motor driving apparatus according to claim 8, wherein the position sensor includes a voltage divider provided between input terminals of the BLDC motor and ground, and provides the output of the voltage divider to the controller.

12. The motor driving apparatus according to claim 8, wherein the driver includes a rectifier circuit to rectify external power, a smoothing circuit to smooth DC power rectified by the rectifier circuit, and a driving circuit to generate driving current of the BLDC motor based on the output of the controller.

13. A motor driving apparatus comprising:
a driver to drive a motor and include a plurality of switching elements; and
a controller to control the driver to drive the motor according to a 90 degree conduction method, wherein, in the 90 degree conduction method, a switching element having been activated, of the plurality of switching elements is deactivated when the motor is rotated by 90 degrees after the switching element is activated.

* * * * *